(12) United States Patent
Nakaie

(10) Patent No.: US 10,397,425 B2
(45) Date of Patent: Aug. 27, 2019

(54) IMAGE READING DEVICE AND IMAGE FORMING APPARATUS

(71) Applicant: FUJI XEROX CO., LTD., Tokyo (JP)

(72) Inventor: Katsuhiko Nakaie, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 86 days.

(21) Appl. No.: 15/592,439

(22) Filed: May 11, 2017

(65) Prior Publication Data

US 2018/0013907 A1 Jan. 11, 2018

(30) Foreign Application Priority Data

Jul. 8, 2016 (JP) .................................. 2016-136312

(51) Int. Cl.
*G06F 15/00* (2006.01)
*H04N 1/00* (2006.01)
*G03G 15/04* (2006.01)
*H04N 1/028* (2006.01)
*H04N 1/12* (2006.01)
*H04N 1/193* (2006.01)
*H04N 1/48* (2006.01)
*G03G 15/00* (2006.01)

(52) U.S. Cl.
CPC ... *H04N 1/00819* (2013.01); *G03G 15/04045* (2013.01); *G03G 15/5062* (2013.01); *H04N 1/00615* (2013.01); *H04N 1/00981* (2013.01); *H04N 1/02815* (2013.01); *H04N 1/125* (2013.01); *H04N 1/193* (2013.01); *H04N 1/486* (2013.01); *G03G 2215/00569* (2013.01); *H04N 2201/0081* (2013.01); *H04N 2201/044* (2013.01)

(58) Field of Classification Search
CPC ........... H04N 1/00819; H04N 1/02815; H04N 1/00981; H04N 1/00615; H04N 1/125; H04N 1/193; H04N 1/486; G03G 15/04045; G03G 15/5062
USPC ......................................... 358/504
See application file for complete search history.

(56) References Cited

U.S. PATENT DOCUMENTS

| 5,731,826 A * | 3/1998 | Hirano | B41J 2/16579 310/320 |
| 6,194,713 B1 * | 2/2001 | Kanazawa | G02B 26/12 250/234 |
| 7,869,103 B2 * | 1/2011 | Ikeda | H04N 1/03 358/449 |

(Continued)

FOREIGN PATENT DOCUMENTS

JP 1-176158 A 7/1989

*Primary Examiner* — Mark R Milia
(74) *Attorney, Agent, or Firm* — Sighrue Mion, PLLC

(57) ABSTRACT

An image reading device includes a light applying unit that applies light from a light source to a recording medium, a detecting unit that detects the light reflected by the recording medium, a holding member that is movable in a first scanning direction of the light applying unit and holds a calibration member to which the light from the light applying unit is applied, a shaft member that extends in the first scanning direction through the holding member and guides the movement of the holding member in the first scanning direction, and a restricting member that extends in the first scanning direction and restricts rotation of the holding member about the shaft member.

11 Claims, 10 Drawing Sheets

(56) References Cited

U.S. PATENT DOCUMENTS

| | | | |
|---|---|---|---|
| 8,780,367 B2* | 7/2014 | Yokota | G03G 15/5062 |
| | | | 358/1.13 |
| 2007/0273949 A1* | 11/2007 | Fukutomi | B41J 2/473 |
| | | | 359/204.1 |
| 2008/0212155 A1* | 9/2008 | Shoji | G02B 26/0825 |
| | | | 359/198.1 |
| 2009/0051996 A1* | 2/2009 | Kuribayashi | G02B 26/123 |
| | | | 359/212.1 |
| 2011/0026983 A1* | 2/2011 | Okamoto | G03G 15/2064 |
| | | | 399/302 |
| 2011/0075213 A1* | 3/2011 | Murayama | G03G 21/1882 |
| | | | 358/1.15 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2016-136312 filed Jul. 8, 2016.

BACKGROUND

(i) Technical Field

The present invention relates to an image reading device and an image forming apparatus.

(ii) Related Art

Some image forming apparatuses have image reading functions of reading images formed therein, so that feedback is given for an operation of controlling a color conversion process performed in an image forming operation.

SUMMARY

According to an aspect of the invention, there is provided an image reading device includes a light applying unit that applies light from a light source to a recording medium, a detecting unit that detects the light reflected by the recording medium, a holding member that is movable in a first scanning direction of the light applying unit and holds a calibration member to which the light from the light applying unit is applied, a shaft member that extends in the first scanning direction through the holding member and guides the movement of the holding member in the first scanning direction, and a restricting member that extends in the first scanning direction and restricts rotation of the holding member about the shaft member.

BRIEF DESCRIPTION OF THE DRAWINGS

An exemplary embodiment of the present invention will be described in detail based on the following figures, wherein.

DETAILED DESCRIPTION

An image reading device and an image forming apparatus according to an exemplary embodiment of the present invention will now be described in detail.

Overall Configuration of Image Forming Apparatus

Figure 1:
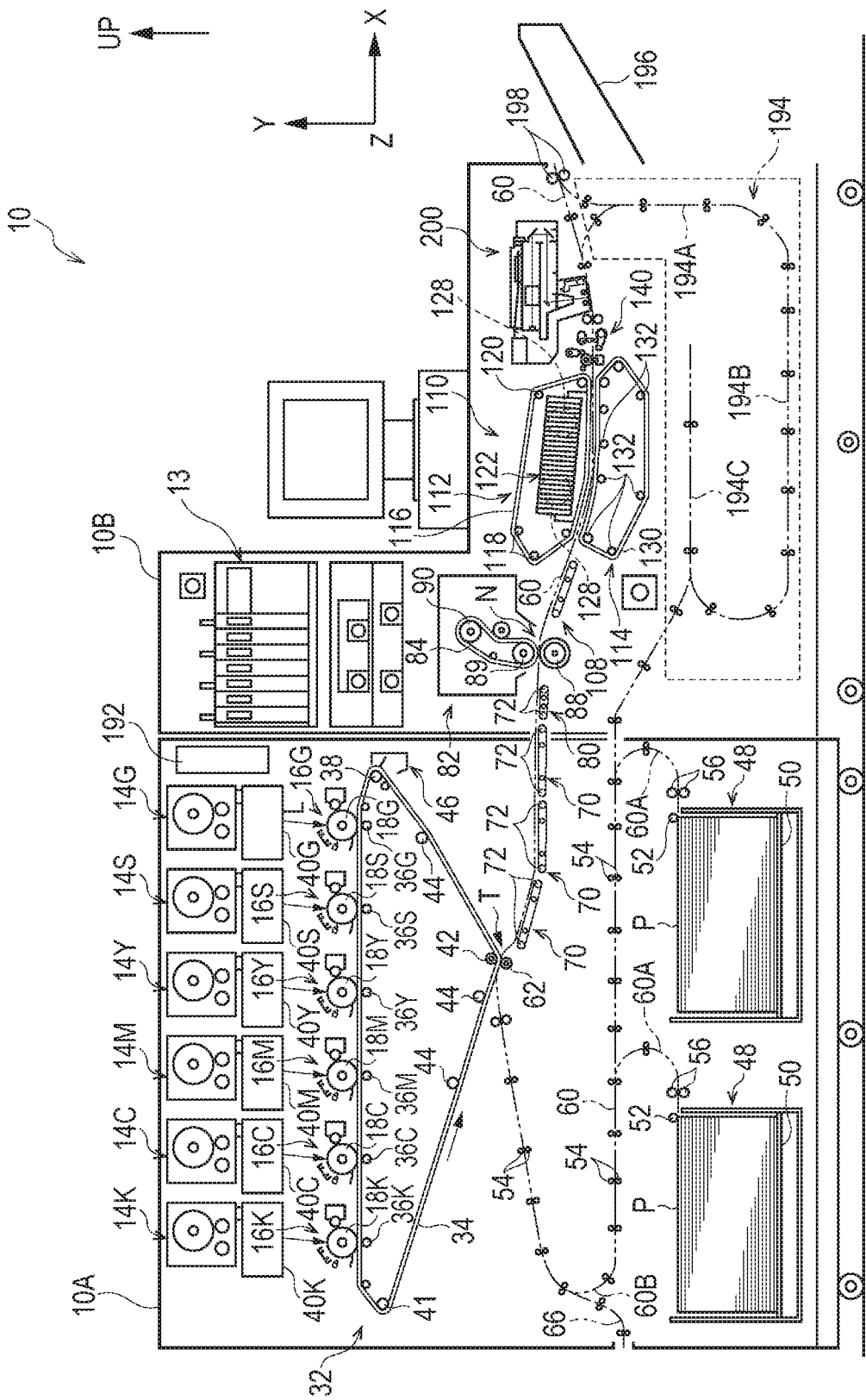
FIG. 1 is a schematic diagram illustrating an exemplary configuration of an image forming apparatus according to the exemplary embodiment.

Referring to FIG. 1, an image forming apparatus 10 according to the present exemplary embodiment selectively forms a full-color image or a monochrome image and includes a first housing 10A that forms an image forming device, and a second housing 10B connected to the first housing 10A. An image processing unit 13 that processes image data supplied from an external apparatus such as a computer is provided in an upper part of the second housing 10B.

Toner cartridges 14Y, 14M, 14C, 14K, 14G, and 14S (also collectively denoted as "toner cartridges 14") that contain respective toners having standard colors of yellow (Y), magenta (M), cyan (C), and black (K); and first and second special colors of gold (G) and silver (S) are provided in an upper part of the first housing 10A.

While the present exemplary embodiment concerns a case where the first and second special colors are gold and silver, the first and second special colors may be, for example, white (W) and clear (CL).

In the following description, individual elements provided for the first special color (G), the second special color (S), yellow (Y), magenta (M), cyan (C), and black (K) are distinguished from one another with reference characters G, S, Y, M, C, and K added as suffixes to reference numerals. If there is no need to distinguish such elements from one another by the colors of the first special color (G), the second special color (S), yellow (Y), magenta (M), cyan (C), and black (K), the suffixes G, S, Y, M, C, and K are omitted.

Six image forming units 16G, 16S, 16Y, 16M, 16C, and 16K (also collectively denoted as "image forming units 16") for the toners having the respective colors are provided below the respective toner cartridges 14.

Exposure devices 40G, 40S, 40Y, 40M, 40C, and 40K (also collectively denoted as "exposure devices 40") provided for the respective image forming units 16 receive the image data processed by the image processing unit 13 from the image processing unit 13 and apply respective light beams L modulated in accordance with the image data to respective image carriers 18G, 18S, 18Y, 18M, 18C, and 18K (also collectively denoted as "image carriers 18"), which will be described later.

In the image forming units 16, the light beams L are applied from the exposure devices 40 to the image carriers 18, whereby respective electrostatic latent images are formed on the image carriers 18.

Each of the image carriers 18 is provided therearound with a scorotron charger that charges the image carrier 18 by corona discharge (a non-contact charging method), a developing device that develops the electrostatic latent image formed on the image carrier 18 by the exposure device 40 into a toner image with the toner, which is an exemplary developer, a blade that removes residual developer particles from the image carrier 18 having undergone a transfer process, and a static eliminator that eliminates static electricity from the image carrier 18 by applying light to the image carrier 18 having undergone the transfer process. The scorotron charger, the developing device, the blade, and the static eliminator are arranged in that order along the surface of the image carrier 18 from the upstream side toward the downstream side in the direction of rotation of the image carrier 18.

A transfer unit 32 is provided below the image forming units 16. The transfer unit 32 includes an annular intermediate transfer belt 34 that is in contact with the image carriers 18, and first transfer rollers 36G, 36S, 36Y, 36M, 36C, and 36K (also collectively denoted as "first transfer rollers 36") that transfer the toner images on the respective image carriers 18 to the intermediate transfer belt 34 such that the toner images are superposed one on top of another.

The intermediate transfer belt 34 is stretched around a driving roller 38 that is driven by a motor (not illustrated), a tension applying roller 41 that applies tension to the intermediate transfer belt 34, a counter roller 42 that is provided across from a second transfer roller 62 to be described later, and plural stretching rollers 44. The intermediate transfer belt 34 is rotated by the driving roller 38 in one specific direction (the counterclockwise direction in FIG. 1).

The first transfer rollers 36 are provided across the intermediate transfer belt 34 from the respective image carriers 18 included in the image forming units 16. A power feeding unit (not illustrated) applies a transfer voltage bias of the polarity opposite to the polarity of the toner to the first transfer rollers 36. Hence, the toner images formed on the image carriers 18 are transferred to the intermediate transfer belt 34.

A removing device 46 is provided across the intermediate transfer belt 34 from the driving roller 38. The removing device 46 removes residual substances such as toner particles and paper lint from the intermediate transfer belt 34 by bringing a blade into contact with the intermediate transfer belt 34.

Plural recording-medium-storing units 48 that store recording media P such as sheets of paper are provided below the transfer unit 32. Each of the recording-medium-storing units 48 is drawable from the first housing 10A and is provided at one upper end (the right end in the front view illustrated in FIG. 1) thereof with a feed roller 52 that feeds each of the recording media P from the recording-medium-storing unit 48 into a transport path 60.

The recording-medium-storing unit 48 includes therein-side a bottom plate 50 on which the recording media P are stacked. When the recording-medium-storing unit 48 is drawn out of the first housing 10A, the bottom plate 50 is lowered in response to an instruction issued by a controller (not illustrated). Since the bottom plate 50 is lowered, a space for allowing the user to supply additional recording media P is provided in the recording-medium-storing unit 48.

When the recording-medium-storing unit 48 drawn out of the first housing 10A is reinserted into the first housing 10A, the bottom plate 50 is raised in response to an instruction issued by the controller. Since the bottom plate 50 is raised, the topmost one of the recording media P on the bottom plate 50 comes into contact with the feed roller 52.

A pair of separating rollers 56 that separate plural recording media P fed at a time from the recording-medium-storing unit 48 from one another are provided on the downstream side in the direction of transport of the recording medium P (hereinafter occasionally referred to as simply "the downstream side") with respect to the feed roller 52. Plural pairs of transport rollers 54 that transport the recording medium P toward the downstream side in the direction of transport are provided on the downstream side of the pair of separating rollers 56.

The transport path 60 extending from the recording-medium-storing units 48 to the transfer unit 32 includes first redirecting parts 60A at each of which the recording medium P fed from a corresponding one of the recording-medium-storing units 48 is redirected toward the left side in the front view illustrated in FIG. 1. The transport path 60 further includes a second redirecting part 60B at which the recording medium P is redirected toward the right side in the front view illustrated in FIG. 1. The transport path 60 then extends toward a transfer position T defined between the second transfer roller 62 and the counter roller 42.

A power feeding unit (not illustrated) applies a transfer voltage bias of the polarity opposite to the polarity of the toner to the second transfer roller 62. Hence, the toner images in the respective colors superposed one on top of another on the intermediate transfer belt 34 are further transferred by the second transfer roller 62 to the recording medium P transported along the transport path 60.

An occasional path 66 extends from a side face of the first housing 10A and merges with the second redirecting part 60B of the transport path 60. A recording medium P fed from another recording-medium-storing unit (not illustrated) that may be provided adjacent to the first housing 10A is feedable through the occasional path 66 into the transport path 60.

Plural transport belts 70 that transport the recording medium P having the toner images thereon toward the second housing 10B are provided in the first housing 10A on the downstream side of the transfer position T. A transport belt 80 that transports the recording medium P received from the transport belts 70 toward the downstream side is provided in the second housing 10B.

The transport belts 70 and the transport belt 80 each have an annular shape and are each stretched between a pair of stretching rollers 72. The pair of stretching rollers 72 are arranged on the upstream side and the downstream side, respectively, in the direction of transport of the recording medium P. One of the pair of stretching rollers 72 is rotated, whereby the transport belt 70 or 80 rotates in one specific direction (the clockwise direction in FIG. 1).

A fixing unit 82 that fixes the toner images on the recording medium P with heat and pressure is provided on the downstream side of the transport belt 80.

The fixing unit 82 includes a fixing belt 84 and a pressing roller 88 provided in contact with the fixing belt 84 from below. The toner images are fixed at a fixing part N defined between the fixing belt 84 and the pressing roller 88. The recording medium P is pressed and heated at the fixing part N.

The fixing belt 84 has an annular shape and is stretched between a driving roller 89 and a follower roller 90. The driving roller 89 faces the pressing roller 88 from above. The follower roller 90 is positioned above the driving roller 89.

The driving roller 89 and the follower roller 90 are each provided thereinside with a heating unit such as a halogen heater, so that the fixing belt 84 is heated.

As illustrated in FIG. 1, a transport belt 108 that transports the recording medium P received from the fixing unit 82 toward the downstream side is provided on the downstream side of the fixing unit 82.

A cooling unit 110 that cools the recording medium P heated by the fixing unit 82 is provided on the downstream side of the transport belt 108.

The cooling unit 110 includes an absorbing device 112 that absorbs the heat of the recording medium P, and a pressing device 114 that presses the recording medium P against the absorbing device 112. The absorbing device 112 is positioned on one side (the upper side in FIG. 1) of the transport path 60, while the pressing device 114 is positioned on the other side (the lower side in FIG. 1) of the transport path 60.

The absorbing device 112 includes an annular absorbing belt 116 that comes into contact with the recording medium P and thus absorbs the heat of the recording medium P. The absorbing belt 116 is stretched around a driving roller 120 and plural stretching rollers 118. The driving roller 120 transmits a driving force to the absorbing belt 116.

A heat sink 122 that is made of, for example, an aluminum material is provided on the inner side of the absorbing belt 116. The heat sink 122 is in surface contact with the absorbing belt 116 and thus radiates the heat absorbed by the absorbing belt 116.

Fans 128 that take the heat from the heat sink 122 and exhaust the heat to the outside are provided on the rear side (the far side in the depth direction in FIG. 1) of the second housing 10B.

The pressing device 114 that presses the recording medium P against the absorbing device 112 includes an annular pressing belt 130 that transports the recording medium P while pressing the recording medium P against the absorbing belt 116. The pressing belt 130 is stretched around plural stretching rollers 132.

A decurling device 140 that decurls the recording medium P by transporting the recording medium P while nipping the recording medium P is provided on the downstream side of the cooling unit 110.

A reading sensor 200 is provided on the downstream side of the decurling device 140. The reading sensor 200 is an exemplary image reading device and detects any defects, such as defects in the toner density, image defects, and errors in the image position, of the toner images fixed as a finished image on the recording medium P. The reading sensor 200 will be described in further detail later.

A pair of discharge rollers 198 are provided on the downstream side of the reading sensor 200. The pair of discharge rollers 198 discharge the recording medium P having the finished image on one side thereof onto an output portion 196 attached to a side face of the second housing 10B.

If images are to be formed on both sides of the recording medium P, the recording medium P that has passed the reading sensor 200 is transported into a reversing path 194 provided on the downstream side of the reading sensor 200.

The reversing path 194 includes a branch part 194A branching off from the transport path 60, a transport part 194B along which the recording medium P received from the branch part 194A is transported in a direction toward the first housing 10A, and a reversing part 194C in which the recording medium P received from the transport part 194B is switched back and is thus turned over.

In the above configuration, the recording medium P switched back in the reversing part 194C is transported toward the first housing 10A into the transport path 60 extending above the recording-medium-storing units 48 and is fed into the transfer position T again.

Now, an image forming operation performed by the image forming apparatus 10 will be described.

Image data processed by the image processing unit 13 is transmitted to the exposure devices 40. The exposure devices 40 apply respective light beams L in accordance with the image data to the respective image carriers 18 having been charged by the respective scorotron chargers, whereby electrostatic latent images are formed on the respective image carriers 18.

The electrostatic latent images on the image carriers 18 are developed by the respective developing devices, whereby toner images in the respective colors of the first special color (G), the second special color (S), yellow (Y), magenta (M), cyan (C), and black (K) are formed.

As illustrated in FIG. 1, the toner images in the respective colors on the image carriers 18 included in the image forming units 16G, 16S, 16Y, 16M, 16C, and 16K are sequentially transferred to the intermediate transfer belt 34 by the six first transfer rollers 36G, 36S, 36Y, 36M, 36C, and 36K in such a manner as to be superposed one on top of another.

The toner images in the respective colors superposed on the intermediate transfer belt 34 are further transferred by the second transfer roller 62 to the recording medium P transported from one of the recording-medium-storing units 48. The recording medium P now having the toner images is transported by the transport belts 70 toward the fixing unit 82 provided in the second housing 10B.

The toner images in the respective colors on the recording medium P are heated and pressed by the fixing unit 82 and are thus fixed. The recording medium P now having the fixed toner images passes through and is cooled by the cooling unit 110. Then, the recording medium P is fed into the decurling device 140, where the recording medium P is decurled.

The decurled recording medium P undergoes the detection of any defects such as image defects that is performed by the reading sensor 200, and is then discharged to the output portion 196 by the pair of discharge rollers 198.

If another image is to be formed on a side of the recording medium P on which no image is formed (in a case of duplex printing), the recording medium P that has passed the reading sensor 200 is turned over in the reversing path 194 and is transported into the transport path 60 extending above the recording-medium-storing units 48. Then, another set of toner images are formed on the back of the recording medium P in accordance with the process that has been described above.

In the image forming apparatus 10 according to the present exemplary embodiment, the elements for forming the toner images in the first special color and the second special color (the image forming units 16G and 16S, the exposure devices 40G and 40S, the toner cartridges 14G and 14S, and the first transfer rollers 36G and 36S) are additional components that are detachable from the first housing 10A at the user's discretion.

Reading Sensor 200

The image forming apparatus 10 according to the present exemplary embodiment includes, as described above, the reading sensor 200 on the downstream side of the decurling device 140. The reading sensor 200 is used for, for example, the detection of whether or not the images formed on the recording medium P by the image forming units 16 have any defects.

The reading sensor 200 used for the above purpose functions as a measuring instrument that measures the tone reproducibility or the color reproducibility of the image forming units 16. To maintain the normality of the function as the measuring instrument, the reading sensor 200 may be calibrated regularly or irregularly.

In the following description, the long-side direction of the image forming apparatus 10 (a second scanning direction corresponding to the direction of transport of the recording medium P) is defined as the X direction, the height direction of the image forming apparatus 10 is defined as the Y direction, and the depth direction of the image forming apparatus 10 (corresponding to a first scanning direction) is defined as the Z direction (see FIGS. 1 and 2). The X direction, the Y direction, and the Z direction are orthogonal to one another. Furthermore, "the front side" refers to a side of the image forming apparatus 10 that is on the near side in FIG. 1, and "the rear side" refers to a side of the image forming apparatus 10 that is opposite the front side.

Figure 2:
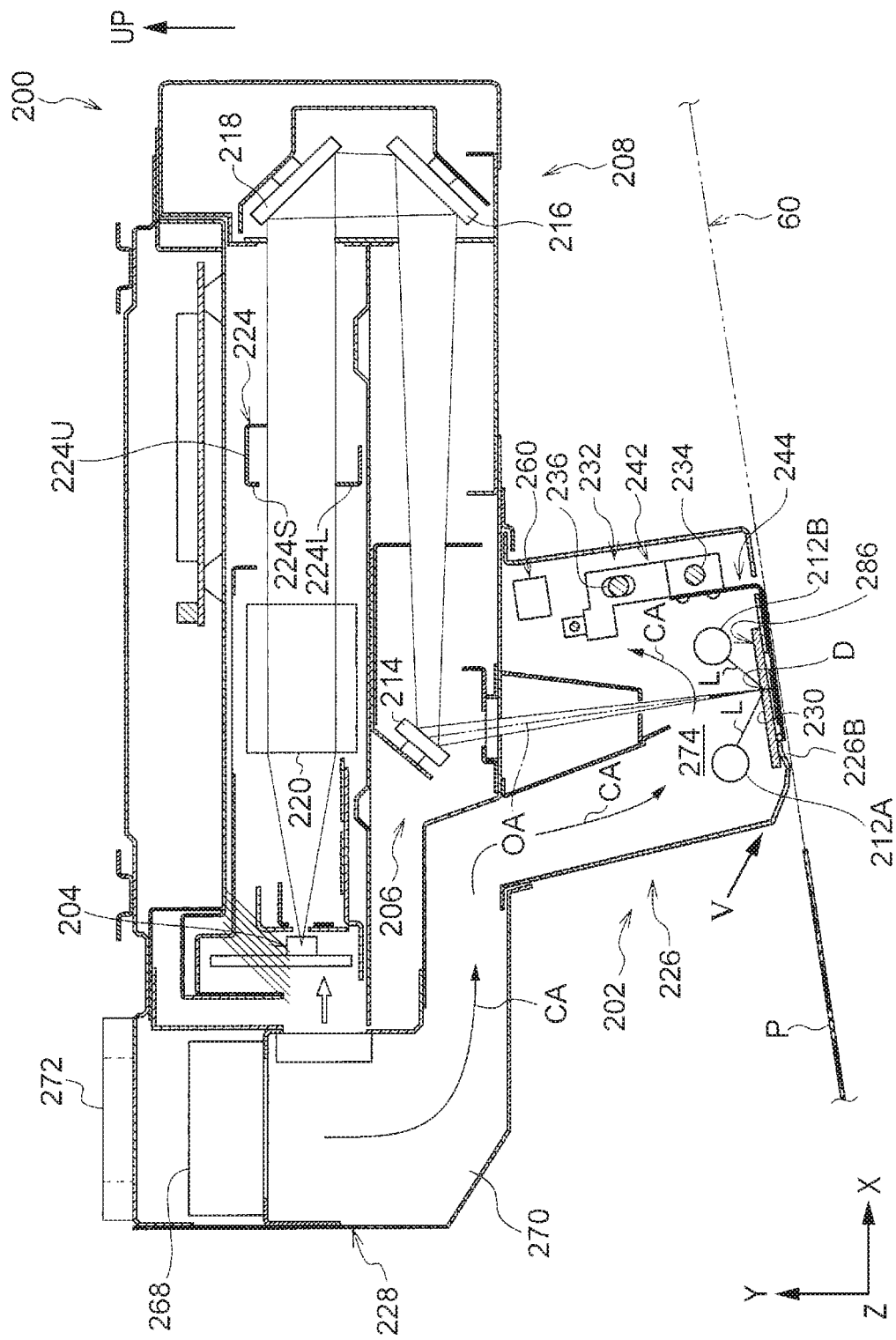
FIG. 2 is a schematic diagram illustrating an exemplary configuration of a reading sensor included in the image forming apparatus according to the exemplary embodiment.

Referring to FIG. 2, the reading sensor 200 as an exemplary image reading device includes a light applying unit 202 that applies light to the recording medium P having an image recorded thereon, and an imaging unit 208 as an exemplary detecting unit that detects the light reflected by the recording medium P. The imaging unit 208 includes a charge-coupled-device (CCD) sensor 204, and an imaging optical system 206 that focuses the light reflected by the recording medium P on the CCD sensor 204.

The CCD sensor 204 according to the present exemplary embodiment includes a red image sensor, a green image sensor, and a blue image sensor each including plural light receiving elements (for example, photodiodes) that are aligned in the first scanning direction. The image sensors for the respective colors each include a filter provided over the light receiving surfaces of the light receiving elements. The filter transmits light of a corresponding one of the color components. The image sensors for the respective colors each output a signal representing the amount of electric charge accumulated with the amount of light of a corresponding one of the color components that is received by the light receiving elements.

The light applying unit 202 includes a pair of lamps 212A and 212B (also collectively denoted as "lamps 212") positioned on the upper side of the transport path 60 along which the recording medium P is transported and extending in the Z direction (the first scanning direction).

The lamps 212 may each be, for example, a fluorescent lamp, a xenon arc lamp, or plural white-light-emitting diodes (LEDs) (not illustrated) aligned in the first scanning direction.

The lamps 212 each illuminate an area wider than the recording medium P of the largest size transportable. The lamps 212 are arranged symmetrically to each other with respect to an optical axis OA (a designed optical axis) of the light reflected by the recording medium P and traveling toward the imaging unit 208.

The light emitted from the lamps 212 is applied to an illuminated position D of a transparent windowpane 286 lying on the transport path 60 and between the lamps 212A and 212B.

The imaging optical system 206 basically includes a first mirror 214 that reflects the light traveling along the optical axis OA to travel in the X direction (in the present exemplary embodiment, toward the downstream side in the direction of transport of the recording medium P), a second mirror 216 that reflects the light reflected by the first mirror 214 to travel upward, a third mirror 218 that reflects the light reflected by the second mirror 216 to travel toward the upstream side in the direction of transport of the recording medium P, a lens 220 that focuses the light reflected by the third mirror 218 on the CCD sensor 204, and an aperture stop unit 224 (224L, 224S, and 224U).

The first mirror 214 has a Z-direction length that is longer than the width of the recording medium P of the largest size. The light reflected by the recording medium P and entering the imaging optical system 206 is sequentially reflected by the first mirror 214, the second mirror 216, and the third mirror 218 while being condensed in the Z direction (the first scanning direction). Thus, the beams of light traveling from all of the points of the recording medium P that are different in the width direction of the recording medium P are made to enter the lens 220, which has a substantially cylindrical shape.

The reading sensor 200 is configured such that the CCD sensor 204 outputs (feeds back) signals corresponding to the light focused thereon, i.e., signals representing the values of the image density, to a control device 192 (see FIG. 1) provided in the image forming apparatus 10. The control device 192 performs a processing operation for correcting the images, formed by the image forming units 16, on the basis of the signals inputted thereto from the reading sensor 200. In the image forming apparatus 10, for example, the intensity of the light beams L emitted from the exposure devices 40, the positions of image formation, and other associated factors are corrected on the basis of the signals transmitted from the reading sensor 200.

The reading sensor 200 further includes a holding member 232, a shaft member 234, and a restricting member 236. The holding member 232 is movable in the first scanning direction (the Z direction) and holds a calibration member 230 to which light is applied from the light applying unit 202. The shaft member 234 guides the movement of the holding member 232 in the first scanning direction. The restricting member 236 restricts the rotation of the holding member 232 about the shaft member 234.

The shaft member 234 is a shaft having a circular sectional shape and extends in the first scanning direction. The two ends of the shaft member 234 are fixed to respective sidewalls 226A of a lower case 226 of the light applying unit 202 included in the reading sensor 200. The sidewalls 226A are opposite each other in the first scanning direction. The reading sensor 200 includes an upper case 228 and the lower case 226. The upper case 228 forms the imaging unit 208.

The restricting member 236 is a shaft having a circular sectional shape and extends in the first scanning direction at a position spaced apart from the shaft member 234 in the height direction (the Y direction) of the image forming apparatus 10. The two ends of the restricting member 236 are fixed to the respective sidewalls 226A of the lower case 226.

The holding member 232 includes a slide portion 242 and a holding plate portion 244. The slide portion 242 has a through hole 238 through which the shaft member 234 extends, and a through hole 240 through which the restricting member 236 extends. The holding plate portion 244 is provided at a lower part of the slide portion 242 and has a free end 244A. The holding plate portion 244 holds the calibration member 230 and is elastically deformable.

Figure 5:
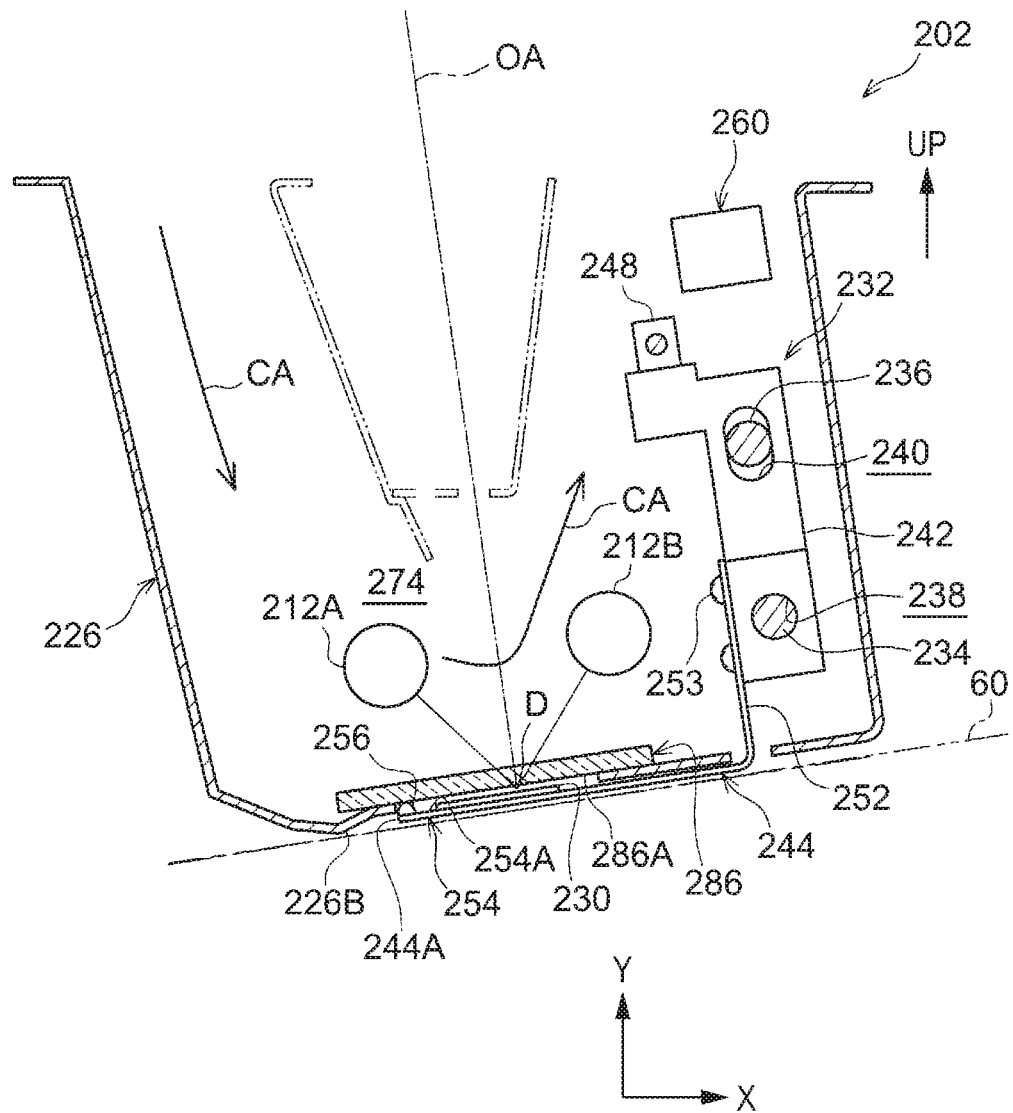
FIG. 5 is an enlargement of a part pointed by arrow V illustrated in FIG. 2.
Figure 6:
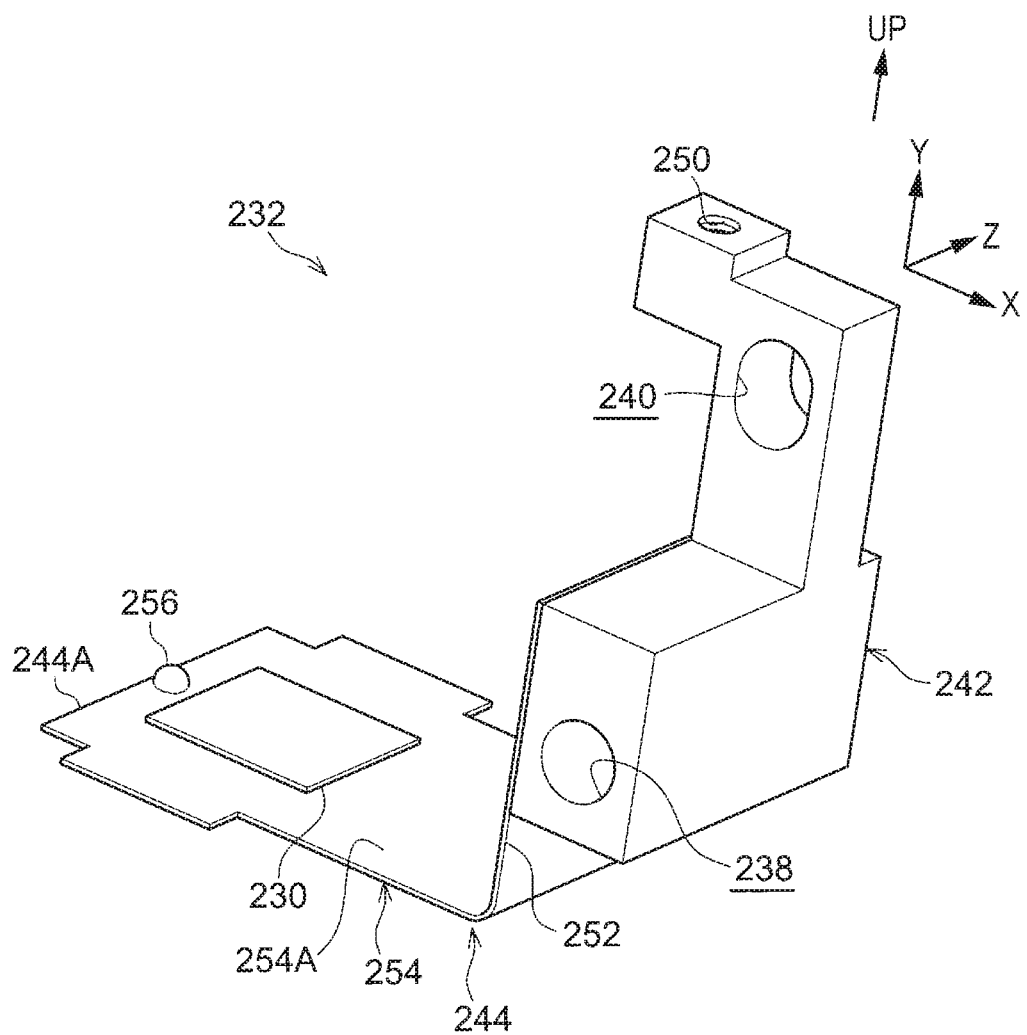
FIG. 6 is an upper perspective view of a holding member.

Referring to FIGS. 5 and 6, the through hole 240 is provided in an upper part of the slide portion 242, and the through hole 238 is provided in a lower part of the slide portion 242. The through hole 240 is an oblong hole whose long-side direction corresponds to the height direction of the image forming apparatus 10. The slide portion 242 also has an attaching hole 250 in an upper surface thereof. The attaching hole 250 is provided for attaching a connecting member 248 to the slide portion 242. The connecting member 248 connects the slide portion 242 to a belt 246 to be described later.

Figure 7:
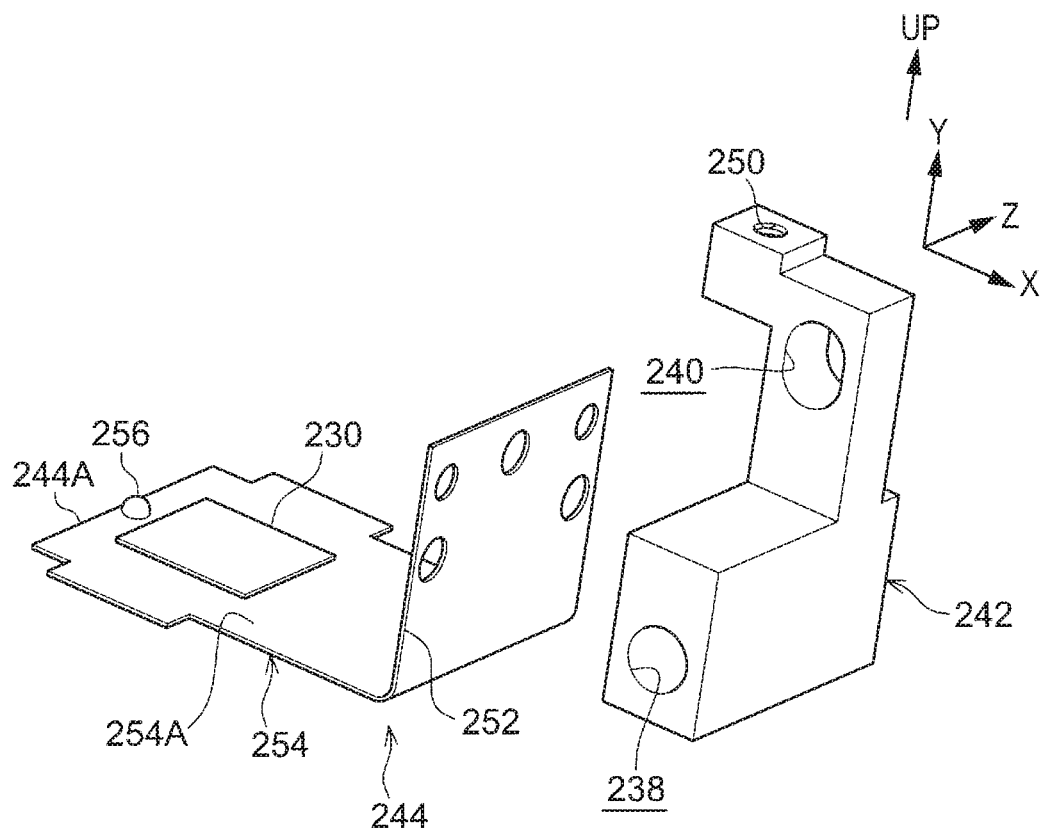
FIG. 7 is an exploded perspective view of the holding member illustrated in FIG. 6.

Referring to FIGS. 6 and 7, the holding plate portion 244 is made of an elastically deformable metal plate that is bent into a substantially L shape. The holding plate portion 244 includes a vertical part 252 and a horizontal part 254. The vertical part 252 is fixed to the lower part of the slide portion 242 with screw members 253. The horizontal part 254 is positioned in such a manner as to face the windowpane 286. The calibration member 230 is attached to an upper surface 254A of the horizontal part 254.

The horizontal part 254 has a projection 256 projecting in the height direction of the image forming apparatus 10 from the upper surface 254A thereof. The projection 256 is provided near the end 244A of the horizontal part 254 that is opposite the vertical part 252. The projection 256 is in contact with a lower surface 286A of the windowpane 286. More specifically, as illustrated in FIG. 5, the projection 256 is pressed against the lower surface 286A of the windowpane 286 under the restoring force exerted by the holding plate portion 244 that is bent. The windowpane 286 according to the present exemplary embodiment is an example of the positioning unit according to the present invention.

The windowpane 286 forms a lower end 226B of the lower case 226 and is at a predetermined distance from the lamps 212. Hence, bringing the projection 256 of the horizontal part 254 into contact with the lower surface 286A of the windowpane 286 makes the calibration member 230 be positioned at a predetermined distance from the lamps 212.

Referring to FIG. 5, the horizontal part 254 of the holding plate portion 244 moves on one side of the recording medium P, the one side being nearer to the lamps 212 than the other side of the recording medium P.

Figure 4:
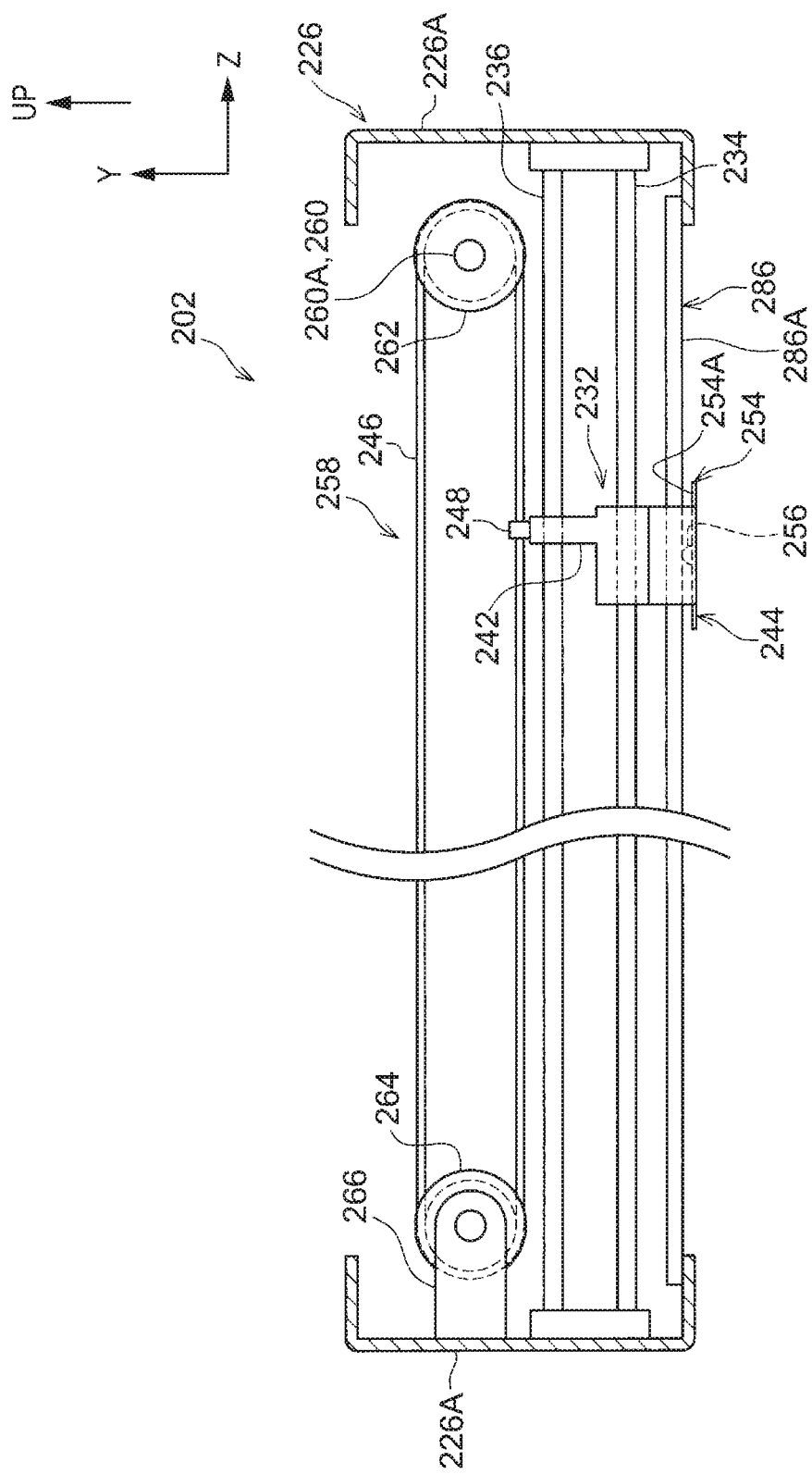
FIG. 4 illustrates the inside of the reading sensor that is seen in a second scanning direction.

Referring to FIG. 4, the lower case 226 is provided with a moving-force-imparting mechanism 258 that imparts a moving force acting in the first scanning direction to the holding member 232.

The moving-force-imparting mechanism 258 includes a driving motor 260 as an exemplary driving source having a motor shaft 260A extending in the second scanning direction, a gear 262 provided for the belt 246 and attached to the motor shaft 260A, a pulley 264 provided at a distance from the driving motor 260 in the first scanning direction and whose axis of rotation extends in the second scanning direction, and the belt 246 stretched between the gear 262 and the pulley 264.

The driving motor 260 is fixed to one of the sidewalls 226A of the lower case 226 with the aid of a bracket (not illustrated). The driving motor 260 is controlled by the control device 192.

The pulley 264 is rotatably supported by a supporting member 266 that is fixed to the other sidewall 226A. The position of the center of rotation of the pulley 264 is adjustable in the first scanning direction by using the supporting member 266. By adjusting the position of the center of rotation of the pulley 264 in the first scanning direction, the tension of the belt 246 stretched between the gear 262 and the pulley 264 is adjustable.

When the driving motor 260 is activated, the belt 246 rotates around the gear 262 and the pulley 264, whereby the holding member 232 connected to the belt 246 with the connecting member 248 moves in the first scanning direction while being guided by the shaft member 234.

The holding member 232 is movable to a position on the outer side in the first scanning direction with respect to each of the widthwise ends of the recording medium P of the largest size transportable. Therefore, when calibration is not performed, the holding member 232 is retractable from an area within which the recording medium P is transported.

The calibration member 230 is provided for the calibration of the imaging optical system 206 and is a white film with reference to which the imaging optical system 206 outputs a predetermined signal.

Referring to FIG. 2, the reading sensor 200 includes a cooling fan 268 as an exemplary air sending unit that sends cooling air to the lamps 212, and a guiding duct 270 extending from the upper case 228 to the lower case 226 and that guides the cooling air toward the lamp 212A.

The cooling fan 268 is provided below an air intake 272 provided in the upper surface of the upper case 228. The cooling fan 268 sends air taken as cooling air from the air intake 272 to the lower side through the guiding duct 270.

The guiding duct 270 extends from the lower side of the cooling fan 268 provided in the upper case 228 up to a position near the lamp 212A provided in the lower case 226. The cooling air is sent through the guiding duct 270 to the other lamp 212B (one of the lamps 212 that is on the downstream side in the second scanning direction).

The cooling air guided through the guiding duct 270 to the lamp 212A flows through an internal space 274 of the lower case 226, in which the lamps 212 are provided, and reaches the lamp 212B. Then, the cooling air flows to the driving motor 260 positioned above the lamp 212B. That is, the driving motor 260 is provided on the downstream side with respect to the lamp 212B in the air sending direction. In FIG. 2, the air sending direction in which the cooling air flows is represented by arrows CA.

Now, functions exerted by the present exemplary embodiment will be described.

Figure 3:
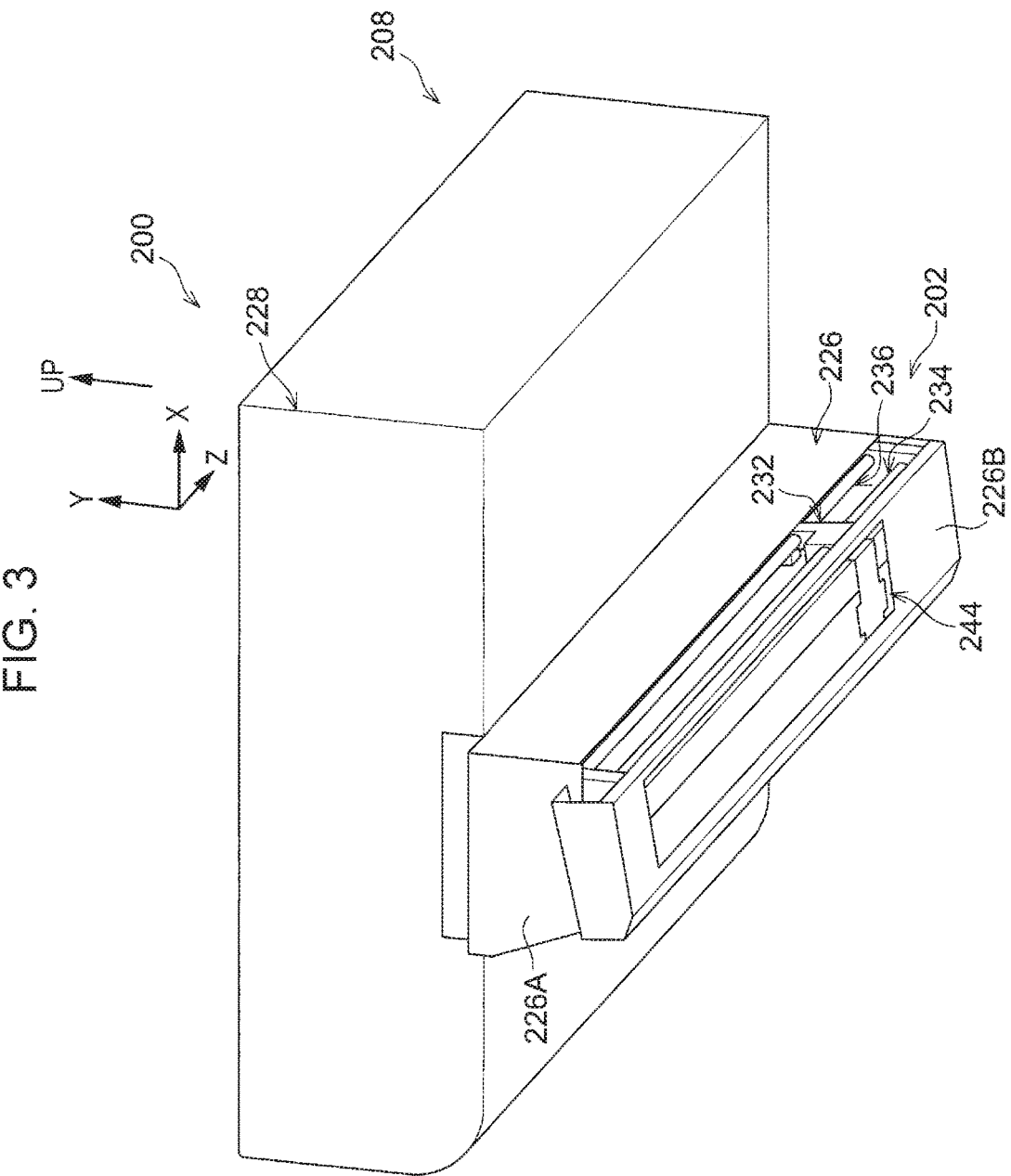
FIG. 3 is a bottom perspective view of the reading sensor.

Referring to FIG. 3, the reading sensor 200 applies light from the pair of lamps 212 to the recording medium P that passes below the light applying unit 202. The light reflected by the recording medium P travels along the optical axis OA to the imaging unit 208 and is focused on the CCD sensor 204 by the imaging optical system 206 included in the imaging unit 208. The CCD sensor 204 outputs signals corresponding to values of the image density at respective positions of the image to the control device 192 of the image forming apparatus 10. The control device 192 corrects associated factors, such as the image density and the position of image formation, on the basis of the signals sent from the CCD sensor 204.

On the other hand, to perform the calibration of the CCD sensor 204 included in the reading sensor 200, the driving motor 260 is first activated, and the calibration member 230 moves together with the holding member 232 in the first scanning direction. Meanwhile, the CCD sensor 204 is adjusted in such a manner as to output a shading correction signal for correcting the distribution of light quantity in the Z direction (the first scanning direction). In this step, the holding member 232 moves in the first scanning direction while being guided by the shaft member 234, and the light reflected by the calibration member 230 is detected by the CCD sensor 204. While the holding member 232 is moving, the restricting member 236 extending through the through hole 240 provided in the holding member 232 restricts the rotation of the holding member 232 about the shaft member 234. Hence, in the reading sensor 200, for example, vibration accompanying the movement of the calibration member 230 is suppressed more than in a case where the rotation of the holding member 232 about the shaft member 234 is not restricted.

Furthermore, since the projection 256 of the holding plate portion 244 is in contact with the lower surface 286A of the windowpane 286 while the holding member 232 is moving, vibration during the movement of the holding member 232 in the first scanning direction is suppressed more than in a case where, for example, the projection 256 is not in contact with the windowpane 286. In other words, the change in the distance between the calibration member 230 and the lamps 212 (the distance in the direction of vibration) is reduced. Particularly, since the windowpane 286 forms the bottom of the lower case 226 housing the lamps 212 and is at a predetermined distance from the lamps 212, the change in the distance between the calibration member 230 and the lamps 212 is reduced effectively.

Furthermore, according to the present exemplary embodiment, the driving motor 260 is provided on the downstream side with respect to the lamps 212 in the air sending direction of the cooling fan 268. Therefore, the heat transfer from the driving motor 260 to the lamps 212 is suppressed more than in a case where, for example, the driving motor 260 is provided on the upstream side in the air sending direction.

Furthermore, according to the present exemplary embodiment, the holding member 232 (specifically, the calibration member 230 provided on the holding plate portion 244) moves on one side of the recording medium P, the one side being nearer to the lamps 212 than the other side of the recording medium P. Therefore, unlike a case where, for example, the holding member 232 is provided across the recording medium P from the lamps 212, light is allowed to be applied to the calibration member 230 even if continuous paper that is continuous in the long-side direction of the image forming apparatus 10 is set as the recording medium P in the image forming apparatus 10.

Furthermore, according to the present exemplary embodiment, since the image forming apparatus 10 includes the reading sensor 200, calibration is performed more stably than in a case where, for example, the reading sensor 200 is not provided.

Furthermore, in the image forming apparatus 10 according to the present exemplary embodiment, the lamps 212 and the calibration member 230 are provided on the same side of the transport path 60 of the recording medium P. Therefore, the image forming apparatus 10 is made smaller than in a case where the calibration member and the lamps are provided across the transport path 60 of the recording medium P from each other (a case where the recording medium P is transported between the calibration member and the lamps).

Figure 8:
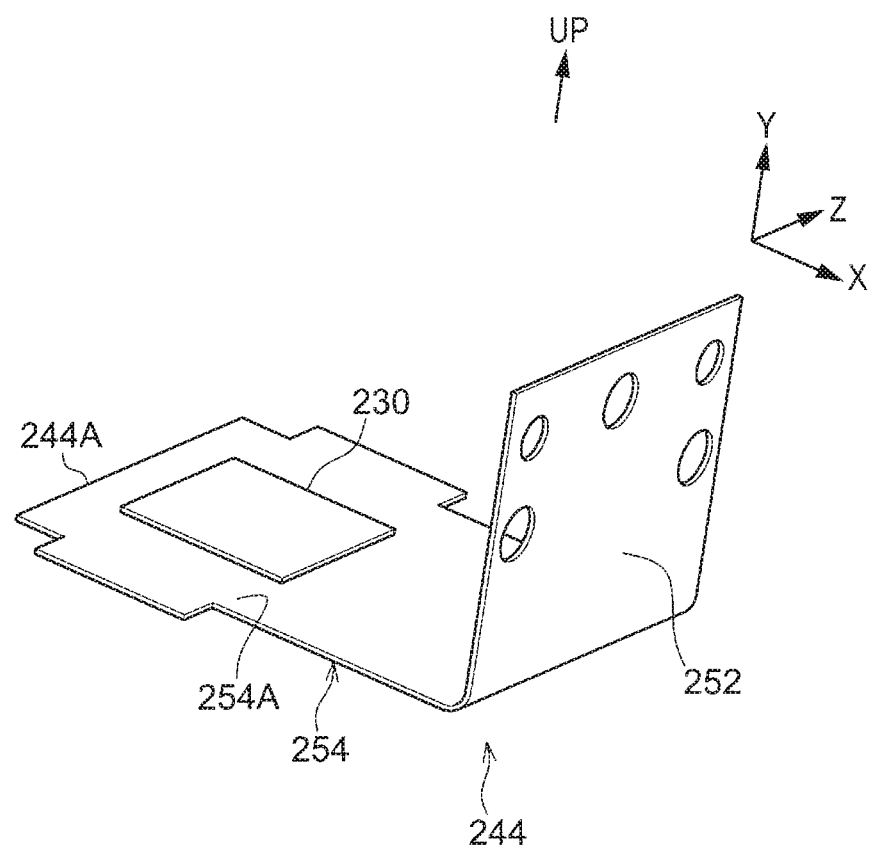
FIG. 8 is a perspective view of a modification of the holding member (a perspective view corresponding to FIG. 6)

While the above exemplary embodiment concerns a case where the horizontal part 254 of the holding plate portion 244 has the projection 256, the present invention is not limited to such a case. For example, as illustrated in FIG. 8, the horizontal part 254 may have no projection 256. Instead of providing the projection 256 on the horizontal part 254, a ridge continuously extending in the first scanning direction may be provided on the lower surface 286A of the windowpane 286, and the upper surface 254A of the horizontal part 254 may be brought into contact with the ridge.

Figure 10:
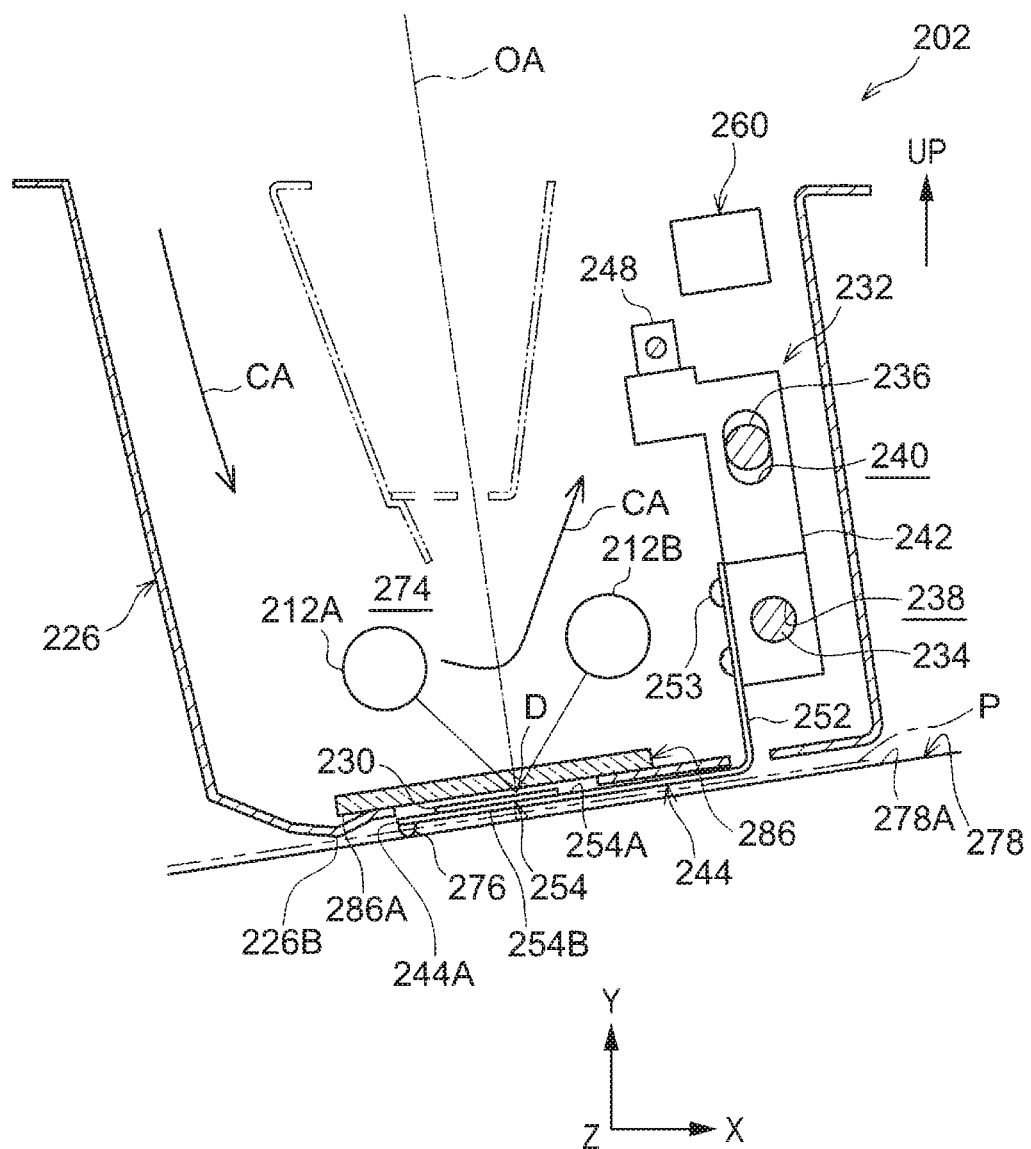
FIG. 10 is a sectional view of a lower part of a modification of the reading sensor (a sectional view corresponding to FIG. 5).

While the above exemplary embodiment concerns a case where the projection 256 of the holding plate portion 244 is in contact with the lower surface 286A of the windowpane 286, the present invention is not limited to such a case. For example, the projection 256 of the holding plate portion 244 may be in contact with a wall of the lower case 226 that extends continuously in the first scanning direction. Alternatively, instead of providing the projection 256 on the horizontal part 254 of the holding plate portion 244, the upper surface 254A of the horizontal part 254 may be brought into contact with a wall of the lower case 226 that extends continuously in the first scanning direction. Alternatively, as illustrated in FIG. 10, a projection 276 may be provided on a lower surface 254B of the horizontal part 254 of the holding plate portion 244, and the projection 276 may be brought into contact with an upper surface 278A of a chute 278 as an exemplary guiding member provided face to face with the windowpane 286 and that guides the recording medium P in the direction of transport.

Figure 9:
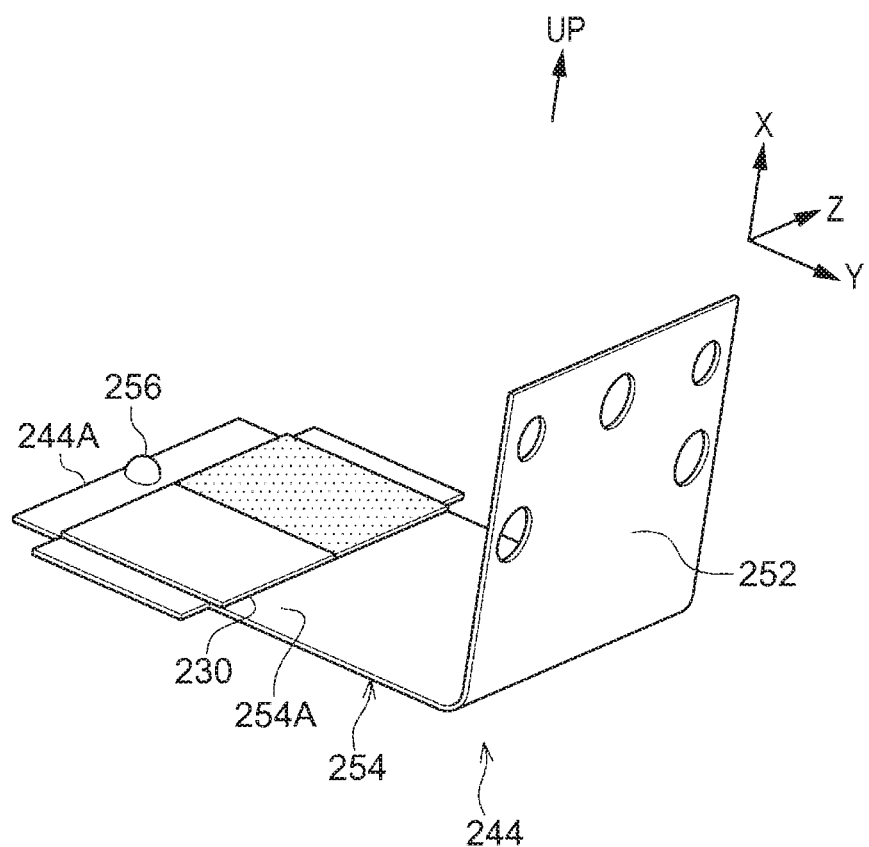
FIG. 9 is a perspective view of another modification of the holding member (a perspective view corresponding to FIG. 6)

While the above exemplary embodiment concerns a case where the entirety of the calibration member 230 is made of a white film, the present invention is not limited to such a case. For example, as illustrated in FIG. 9, a part of the calibration member 230 may be made of a white film, while the other part of the calibration member 230 may be made of a film having patterns of different colors with reference to which the imaging optical system 206 outputs predetermined signals.

If plural white LEDs aligned in the first scanning direction are employed as each of the lamps 212, the white LEDs may each be caused to emit light only when the calibration member 230 that is moving in the first scanning direction passes therebelow.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a light applier configured to apply light from a light source to a recording medium;
   a detector configured to detect the light reflected by the recording medium;
   a holding member that is movable in a first scanning direction of the light applier and configured to hold a calibration member to which the light from the light applier is applied;
   a shaft member extending in the first scanning direction through the holding member and configured to guide the movement of the holding member in the first scanning direction; and
   a restricting member that extends in the first scanning direction and configured to restrict a rotation of the holding member about the shaft member.

2. The image reading device according to claim 1, further comprising:
   a positioner extending in the first scanning direction and is at a predetermined distance from the light source of the light applier,
   wherein the holding member includes:
      a holding plate portion that is elastically deformable with one end being a free end and holds the calibration member; and
      a contact portion that is in contact with the positioner under a restoring force exerted by the holding plate portion.

3. The image reading device according to claim 2, wherein the positioner is provided on a case that forms the light applier or on a guiding member configured to guide transport of the recording medium.

4. The image reading device according to claim 2, further comprising:
   an air sender configured to send cooling air to the light source of the light applier; and a driving source configured to move the holding member in the first scanning direction, wherein the driving source is provided on a downstream side with respect to the light source in an air sending direction in which the air sender sends the cooling air.

5. The image reading device according to claim 2, wherein the holding member moves on one side of the recording medium, the one side being nearer to the light source of the light applier than another side of the recording medium.

6. The image reading device according to claim 3, further comprising:

an air sender configured to send cooling air to the light source of the light applier; and a driving source configured to move the holding member in the first scanning direction, wherein the driving source is provided on a downstream side with respect to the light source in an air sending direction in which the air sender sends the cooling air.

7. The image reading device according to claim 3, wherein the holding member moves on one side of the recording medium, the one side being nearer to the light source of the light applier than another side of the recording medium.

8. The image reading device according to claim 1, further comprising:

an air sender configured to send cooling air to the light source of the light applier; and a driving source that configured to move the holding member in the first scanning direction, wherein the driving source is provided on a downstream side with respect to the light source in an air sending direction in which the air sender sends the cooling air.

9. The image reading device according to claim 8, wherein the holding member moves on one side of the recording medium, the one side being nearer to the light source of the light applier than another side of the recording medium.

10. The image reading device according to claim 1, wherein the holding member moves on one side of the recording medium, the one side being nearer to the light source of the light applier than another side of the recording medium.

11. An image forming apparatus comprising:

an image forming device configured to form an image on a recording medium; and the image reading device according to claim 1 that applies light to the recording medium having the image and reads the image by detecting the light reflected by the recording medium.

\* \* \* \* \*